United States Patent [19]
Minning et al.

[11] 4,300,624
[45] Nov. 17, 1981

[54] OSMOTIC PUMPED HEAT PIPE VALVE

[75] Inventors: Charles P. Minning, S. Pasadena; George L. Fleischman, Cerritos, both of Calif.

[73] Assignee: Hughes Aircraft Company, Culver City, Calif.

[21] Appl. No.: 103,884

[22] Filed: Dec. 17, 1979

[51] Int. Cl.³ .................. F28D 15/00; F28F 13/00
[52] U.S. Cl. ........................................ 165/32; 165/96; 165/104.22; 165/104.27; 417/207
[58] Field of Search ................ 165/105, 96, 32; 417/52, 53, 207

[56] References Cited
U.S. PATENT DOCUMENTS

| 3,427,978 | 2/1969 | Hannenman et al. | 417/48 |
| 3,561,525 | 2/1971 | Baer | 165/105 |
| 3,621,666 | 11/1971 | Mobadam | 417/207 X |
| 3,677,337 | 7/1972 | Midolo | 165/105 |
| 4,216,903 | 8/1980 | Giuffre | 165/105 X |

Primary Examiner—Albert W. Davis
Attorney, Agent, or Firm—Lewis B. Sternfels; W. H. MacAllister

[57] ABSTRACT

A bubble (32) of non-condensable gas between a solvent permeable membrane (18) and solvent within a solvent reservoir (16) limits the amount of surface area of the membrane wettable by the solvent and thereby limits the amount of solvent capable of passing through the membrane into the solution reservoir (12).

14 Claims, 2 Drawing Figures

OSMOTIC PUMPED HEAT PIPE VALVE

The Government has rights in this invention pursuant to Contract No. F33615-77-C-3031 awarded by the Department of the Air Force.

TECHNICAL FIELD

The present invention relates to osmotic pumped heat pipes and, in particular, to a means and method for controlling the rate of osmotic pumping therein.

BACKGROUND ART AND OTHER CONSIDERATIONS

Unlike the capilliary wick in a conventional heat pipe, the pumping rate across the membrane, separating the solvent and solution reservoirs, in an osmotic pumped heat pipe, does not automatically match the heat input rate. Thus, the working fluid, comprising the solvent, would continue to flow through the membrane and into the solution reservoir, even after the heat source was removed from the evaporator unless flow were prevented. Conventionally, flow of working fluid is shut off by a mechanical valve, using the effect of pressure retarded osmosis, or by regulating the heater power. However, in practice the heat input cannot always be regulated, and a mechanical valve is complex and expensive to implement within an osmotic pumped heat pipe.

SUMMARY OF THE INVENTION

The present invention overcomes and avoids the above problem by limiting the amount of surface area of the solvent permeable membrane from contact with the solvent. Preferably, such limiting utilizes a non-condensable gas which is positionable adjacent the membrane on the solvent side thereof. By "non-condensable" is meant a gas which will not condense within the operating temperature-pressure parameters of the heat pipe.

It is, therefore, an object of the present invention to control the rate of osmotic pumping in an osmotic pumped heat pipe.

Another object is to provide such control either actively or passively.

Other aims and objects as well as a more complete understanding of the present invention will appear from the following explanation of an exemplary embodiment and the accompanying drawing thereof.

DETAILED DESCRIPTION OF THE INVENTION

Figure 1:
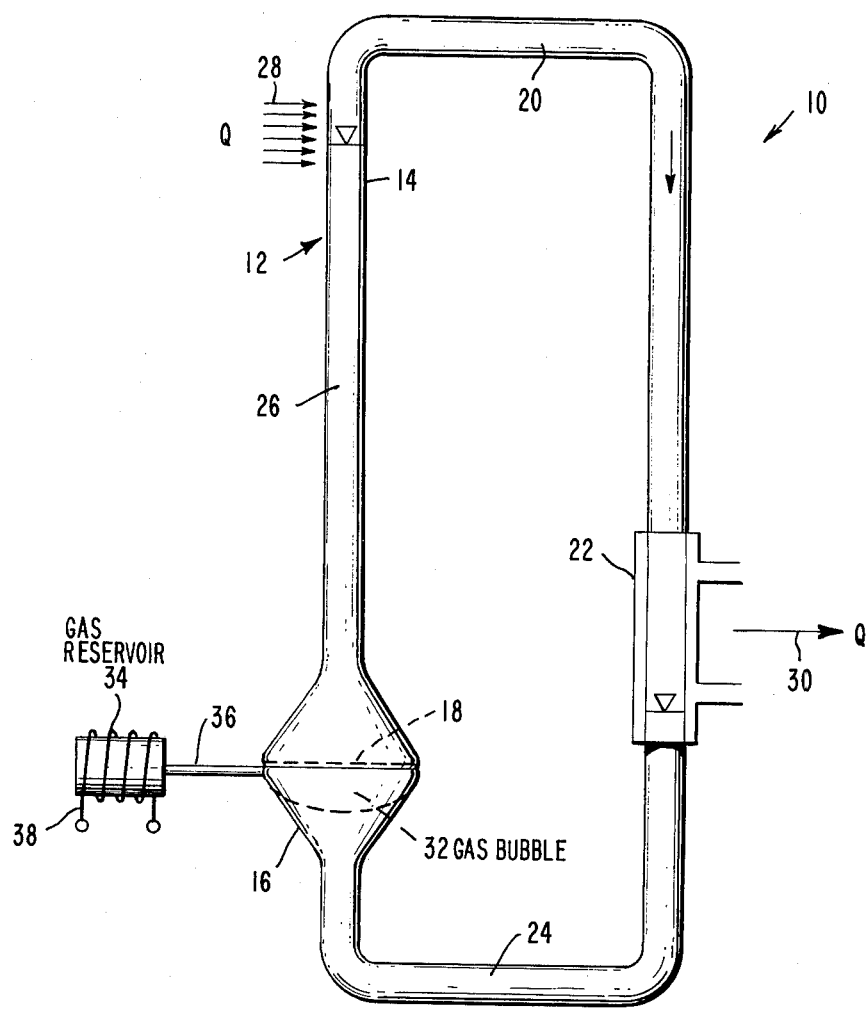
FIG. 1 depicts a preferred embodiment of the invention using active control.

In FIG. 1, an osmotic pumped heat pipe 10 includes a solution reservoir 12 having an evaporator section 14, a solvent reservoir 16, a solvent permeable membrane 18 separating the reservoirs, a vapor conduit 20 coupled between the evaporator and a condenser 22, and a solvent condensate tube 24 coupling the condenser and the solvent reservoir. A solution 26, comprising a solute-solvent mixture, is placed within reservoir 12 while a solvent alone is placed within reservoir 16.

As is conventional in such heat pipes, heat designated by "Q" is applied to evaporator 14 as denoted by the direction of arrows 28 to form solvent vapors from solution 26. These vapors are transported along tube 20 to condenser 22 where heat, designated also by "Q", is removed as depicted by arrow 30. Condenser 22 therefore removes heat from the vapor which then condenses into liquid solvent which, in turn, moves from reservoir 16 through membrane 18 by the process of osmotic pumping.

To control the rate at which solvent osmotically moves through membrane 18, the surface area of the membrane, which is in contact with the solvent, is controlled by insertion of a gas bubble 32 into solvent reservoir 16 adjacent the membrane. The bubble can be formed from any non-condensable gas. Pumping begins when the non-condensable gas is withdrawn from reservoir 16. Collapse or presence of the bubble is controllable actively or passively.

Active control, as illustrated in FIG. 1, comprises use of a gas reservoir 34 coupled to solvent reservoir 16 by a conduit 36. A heater 38 may be placed about the gas reservoir so that, by selective heating or cooling of the gas reservoir, gas is respectively inserted into or withdrawn from reservoir 16.

Figure 2:
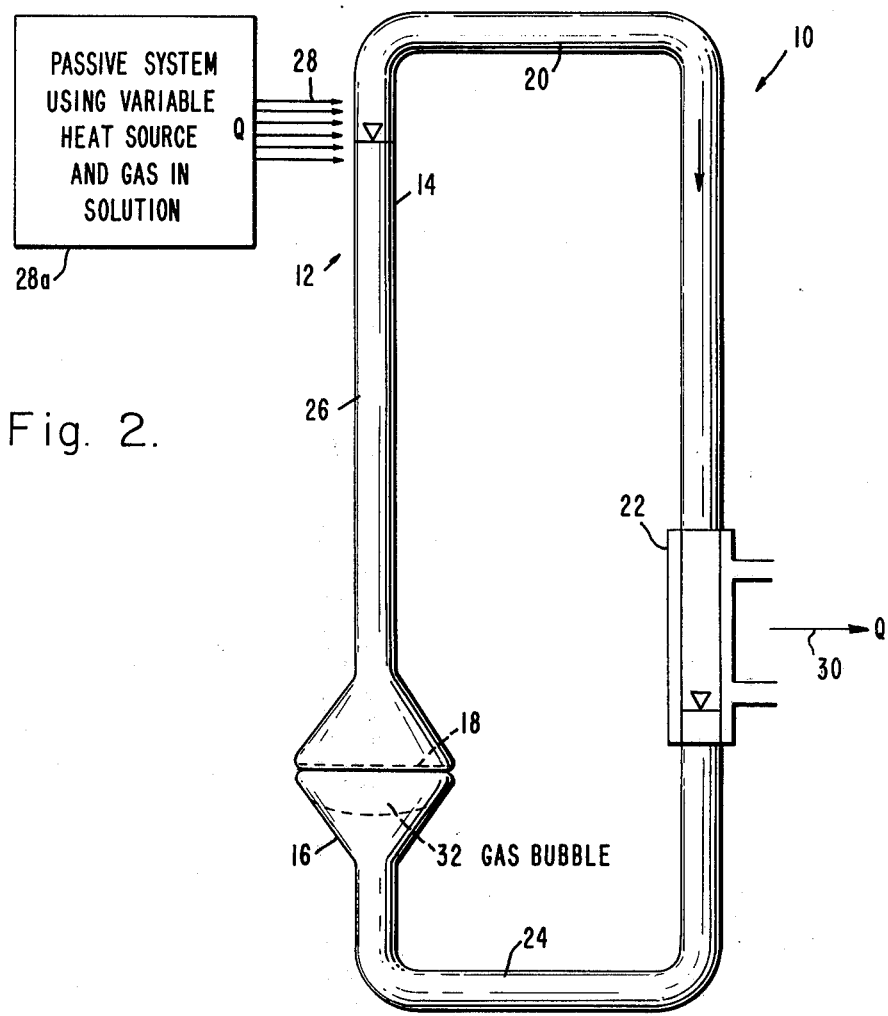
FIG. 2 illustrates a modification thereof using passive control.

Passive control as shown in FIG. 2, may be achieved by controlling the amount of pressure exerted upon the solvent within reservoir 16. For this purpose, a certain amount of air or other non-condensable gas must be contained within the solvent. As pressure upon the solvent is decreased below ambient, air is forced from the solvent to permit formation of a bubble which rests against membrane 18. As the pressure is increased, the air will again pass into the solvent and the bubble will collapse. Such pressure is obtainable in direct proportion to the amount of heat "Q" applied in evaporator 14 as depicted by arrows 28 through the intermediary of mechanism 28a. By increasing the heat input, the pressure increases and air moves into the solvent to decrease the amount of bubble 32 appearing against membrane 18 and, consequently, to start operation of the heat pipe. As the heat is removed, the pressure against the solvent decreases, and air moves from the solvent to create a larger bubble 32 which effectively limits contact of the solvent against the membrane and to prevent osmotic pumping therethrough.

Control of pumping intermediate to the extremes of no and full pumping is effected by a relative greater or lesser amount of bubble which is in contact with the membrane.

Although the invention has been described with reference to a particular embodiment thereof, it should be realized that various changes and modifications may be made therein without departing from the spirit and scope of the invention.

What is claimed is:

1. In an osmotic pumped heat pipe having reservoirs with solvent and solution therein and solvent permeable membrane material between said reservoirs, the improvement for controlling the rate of osmotic pumping through said membrane material comprising means for limiting the surface area of said membrane material contactable by said solvent.

2. The improvement according to claim 1 wherein said limiting means comprises a non-condensable gas positionable between said membrane material and said solvent.

3. The improvement according to claim 2 wherein said limiting means further comprises means for inserting and removing said gas into said solvent reservoir adjacent said membrane material.

4. The improvement according to claim 3 wherein said inserting and removing means comprises a gas reservoir and a conduit coupled between said gas and solvent reservoirs.

5. The improvement according to claim 4 further including means for selectively heating and cooling said gas reservoir respectively for inserting and withdrawing said gas from said solvent reservoir.

6. The improvement according to claim 3 wherein said inserting and removing means comprises means for exerting and withdrawing pressure on and from said solvent.

7. The improvement according to claim 3 wherein said pressure exerting and removing means comprises means for applying solvent vapor against said solvent in said solvent reservoir.

8. The improvement according to claim 7 further including means for selectively heating said solution for selectively creating said solvent vapor.

9. A method for controlling the rate of osmotic pumping of solvent from a solvent reservoir to a solution reservoir across a solvent permeable membrane separating the reservoirs, comprising the step of limiting the amount of surface area of the membrane capable of being wetted by the solvent.

10. A method according to claim 9 wherein said limiting step comprises the step of positioning a non-condensable gas between said membrane and said solvent.

11. A method according to claim 10 wherein said positioning step comprises the steps of inserting and removing the gas into and from the solvent reservoir adjacent the membrane.

12. A method according to claim 11 wherein said inserting and removing steps comprise the respective steps of increasing and decreasing pressure against the solvent.

13. A method according to claim 12 wherein said pressure increasing and decreasing steps comprise the step of proportionately producing solvent vapors from the solution.

14. A method according to claim 11 wherein said inserting and removing steps comprise the steps of transferring the gas respectively from or to a gas reservoir coupled to the solvent reservoir at a point adjacent to the membrane.

* * * * *